Sept. 6, 1949.  H. FRIEDMAN ET AL  2,480,846
ICE DETECTOR
Filed Jan. 16, 1945  2 Sheets-Sheet 1
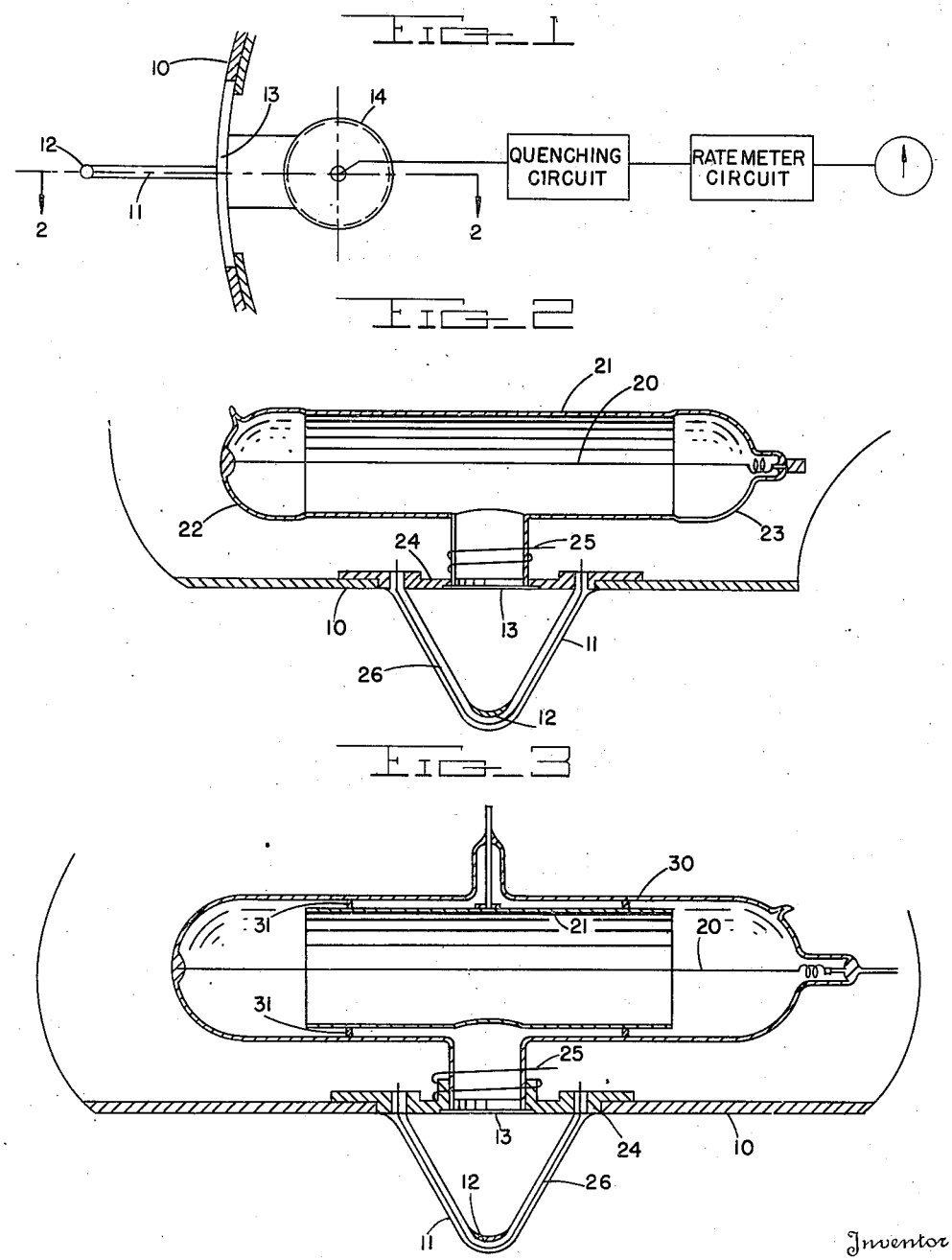
Inventor
HERBERT FRIEDMAN
LESTER WOLFE
By F. L. Bush
Attorney Sept. 6, 1949.　　　　　H. FRIEDMAN ET AL　　　　　2,480,846
ICE DETECTOR
Filed Jan. 16, 1945　　　　　　　　　　　　　2 Sheets-Sheet 2
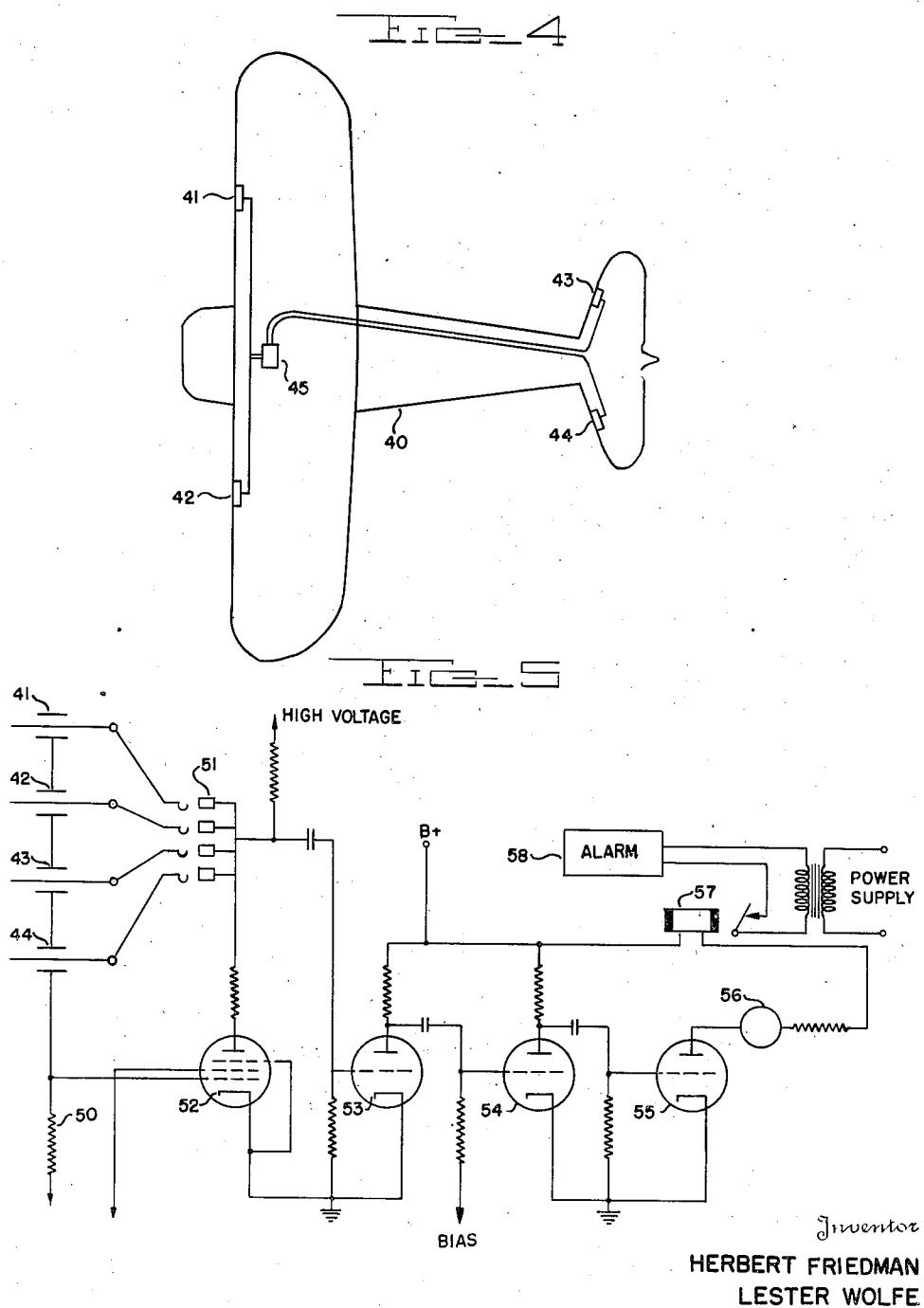

Patented Sept. 6, 1949

2,480,846

UNITED STATES PATENT OFFICE 2,480,846

ICE DETECTOR

Herbert Friedman, Arlington, Va., and
Lester Wolfe, Washington, D. C.

Application January 16, 1945, Serial No. 573,092

11 Claims. (Cl. 250—83.6)

(Granted under the act of March 3, 1883, as
amended April 30, 1928; 370 O. G. 757)

Our invention relates to warning devices and particularly to an ice detector and warning device for use in aircraft to detect the beginning of ice formation on prominent surfaces and to warn the pilot thereof.

It is axiomatic that aircraft encounter icing conditions in flight. The exact combination of temperature humidity, electrical state of the atmosphere and altitude which causes ice formation on aircraft is somewhat obscure. Several points or surfaces of an aircraft, namely, air foils of the wings, the tail, the wheel mechanisms and the air intake to the engine, are generally more subject to ice formation than other parts. The difficulties which can be caused by the formation of an apppreciable amount of ice on any one of these surfaces are quite evident and need no elaboration.

An ideal instrument for use aboard aircraft would be one which would predict, well in advance, the approach of icing conditions. The impossibility of designing and constructing such an instrument for use aboard aircraft is manifest. A reasonable approach to an instrument capable of giving such performance would be a device which would detect the formation of ice at a very early stage. Instruments in use aboard aircraft today for detection of ice formation are in general unwieldy and unsatisfactory, for they depend upon the actual mechanical detection of the growth of a relatively thick layer of ice on the surface of an aircraft.

Photoelectric ice detectors have been designed for use in detecting the formation of ice on aircraft surfaces but they suffer from the disadvantage that they depend upon the quality of ice formed, that is to say, if the ice is clear and transparent it may go undetected for a considerable time, and if it is very frosty, or, is rime ice, it will be detected at an early stage.

It is a primary object of our invention to provide a simple ice detector capable of detecting the beginning of ice formation, which detector is mountable on any surface of an aircraft subject to ice formation, particularly the air foil of the wing or the air intake passage of an engine.

It is a second object of our invention to eliminate dependence of the ice detector upon mechanical or moving parts or impedance imparted to their movement by virtue of ice formation thereon.

It is a further object of our invention to provide apparatus capable of detecting ice formation and determining the rate of its formation upon any surface of the aircraft, It is still a further object of our invention to provide apparatus capable of detecting the formation of ice of any sort namely, rime ice, clear ice or sleet and to detect the beginning of the formation thereof.

It is another object of our invention to provide apparatus capable of giving the pilot or operator of an aircraft a quantitative indication of the amount of ice formed or forming and the rate of its formation on surfaces of the aircraft.

Other objects and advantages of our invention will in part be obvious and in part appear hereinafter.

Accordingly, our invention comprises an apparatus for detecting ice formation on surfaces, and giving warning thereof; particularly surfaces of aircraft, the apparatus being so constructed that the surface on which the ice forms is interposed between a source of penetrating radiation and a radiation detector such as a Geiger-Muller tube, and the ice formation is detected and its rate of formation determined by measuring the amount of decrease and rate of decrease of the intensity of radiation received by the detector. For a fuller understanding of the nature and objects of our invention, reference should be had to the following specification and accompanying drawings, in which, Figure 1 is a diagram of a simple apparatus embodying the principle of our invention and is represented as a vertical section through the surface on which the ice formation is to be detected;

Figure 2 is a diagram comprising a horizontal section through the apparatus of Figure 1 along the line 2—2;

Figure 3 is a diagram showing an alternative form of the apparatus of Figure 2 and may be considered equivalent to a section taken along the line 2—2 of Figure 1;

Figures 4 and 5 illustrate the embodiment of the detector as an ice detection and warning system for aircraft.

In Figure 1 in which we have shown generally the relationship of the parts of our ice detecting apparatus, 10 represents the surface on which ice is expected to form, 11 is a support to hold spaced from said surface a source 12 of penetrating radiation. Flush with the surface 10, or forming a part thereof, is radiation permeable window 13 of radiation detector 14. The detector 14 is electrically connected to a quenching circuit, amplifier, rate meter circuit, indicator and alarm.

In Figure 2, which is a section taken along line 2—2 of Figure 1, we have shown in greater detail the nature of the elements of the device shown in Figure 1. The detector is a Geiger-Muller tube having an anode 20 and a metal cathode 21. Insulating supports 22 and 23 maintain the anode and cathode in spaced relationship. It is seen that the cathode actually forms the body of the tube and is T-shaped to permit mounting of a radiation permeable window thereon. The extension of the cathode or tube shell is expanded into a flange 24 to permit mounting it on a surface. The tube can be fastened to the surface 10 by bolting, riveting, welding, brazing or soldering the flange 24 thereto. The window 13 of the tube is preferably made of beryllium and is made flush with the surface 10. Alternatively, the surface 10 can be made to function as the window of the tube by building the tube in place. That is, an unfinished or windowless tube is fastened to the surface, evacuated and filled according to the principles elaborated herein.

Figure 3 shows a structure similar to that of Figure 2 but here the anode and cathode are enclosed in a glass or insulating envelope 30. The anode wire 20 is supported at its ends by sealing it into the envelope. The cathode is maintained in position in the envelope by studs 31. Aligned with the window 13 of the tube, the cathode has an aperture in order to admit ionizing rays into the active volume of the tube defined by the cathode cylinder. The flange 24 is fastened to the glass by sealing or, more readily, by using metalized glass and soldering (silver solder) it to the flange. The flange is attached to the surface, as pointed out above, by bolting, riveting, welding, brazing, or soldering.

Heating wires 25 and 26 are placed in close relationship to the window 13 and the radiation source 12 in order that the ice sensitive surfaces can be freed of ice when it is desired to determine the rate of ice accumulation. It is contemplated that at some time after the formation of ice has been noted it will be desirable to learn its rate of formation. In such an event, the heating coils would be activated, the ice melted away from the detecting surface and thus provision made for starting from a null.

In Figures 4 and 5 we have shown how the ice detector of our invention is incorporated into an ice detecting and warning system for use in aircraft. Generally it is the leading edges of the wing and tail of an airplane which first start to accumulate ice and, consequently, the best places to mount ice detectors are these several points. Referring to Figure 4, 40 represents the body of an airplane and 41, 42, 43 and 44 represent ice detector tubes mounted in the leading edges of the wings and tail respectively. In the figure it is indicated diagrammatically that all of the detector tubes are connected to a central measuring and indicating circuit 45 which is located in the control cabin of the airplane.

In Figure 5 one arrangement of circuit elements is shown by which the indication from any detector tube in any part of the airplane can be read. The arrangement as shown includes the detectors 41, 42, 43 and 44, shown in Figure 4, the cathodes of which are connected to a biasing voltage through resistor 50. The anodes of the several detectors are connected to a high voltage, of the order of 1000 volts, through selector switch 51. Across the bank of detectors, quenching tube 52 is connected. It is followed by two stages of amplification, 53 and 54, and finally the measuring circuit which includes tube 55 and meter 56. Relay 57 which controls the operation of alarm 58 is shown included in the measuring circuit.

The operation of the circuit is clear. When there is no ice on the indicator which is in condition for operation when the high voltage is applied thereto, that detector will be pulsing at a maximum rate. Positive voltage pulses will appear across resistor 59 corresponding to the pulses of the detector tube. The function of tube 52 is to quench rapidly the discharges of the detector tubes, which it does when it is thrown into a strongly conducting state by the positive pulse applied to its grid through resistor 50. The corresponding negative pulse taken off from the plate of tube 52 is passed through two stages of amplification in order that negative pulses of uniform amplitude be counted by rate meter circuit 55 and 56. Since it is desired to have meter 56 read zero when the pulsing rate of the detector tube is a maximum, the number of amplification stages is so selected that the polarity of the pulses applied to the grid of tube 55 will be negative. Any accumulation of ice on the detector will cause its discharge frequency to decrease, the grid of tube 55 will become less negative, current will flow in its plate circuit and the reading of meter 56 will give an indication of the amount of ice on the detector. Relay 57 can be set to activate alarm 58 at any stage of ice formation, which will correspond to a given flow of current in the plate circuit of tube 55.

For purposes of quick detection of ice formation, it is desirable to use beta rays. Since our source of radiation is preferably a few micrograms (approximately 20) of radium, it is necessary to have the Geiger-Muller detector preferentially sensitive to beta rays. One way in which we achieve this result is to use a Geiger-Muller tube having a copper or brass cathode and a steel wire anode. Both the anode and cathode, in the preparation of the tube, are carefully cleaned and outgassed. The tube is then filled with a readily ionizable gas such as hydrogen, argon, or methane to a pressure of about four centimeters of mercury. If it is desired to have the tube be of the self quenching type, alcohol vapor may be added to the gas filling of the tube as is well known and practiced in the art. However, since the major contemplated application of our device will be as an ice detector in aircraft where extremely low temperatures are inevitably encountered, we prefer to use a non-self-quenching type of tube together with an external quenching circuit as we have indicated in our schematic diagrams of Figures 1 and 5.

Since the radium or radioactive source emanates alpha, beta and gamma rays and it is desired to depend upon beta rays for the ice indication, differentiation among the three types of radiation is necessary. We have found that the use of a beryllium window on the tube aids materially in obtaining this result. The beryllium window if made 0.030" thick is sufficient to stop the massive alpha particles from penetrating into the active volume of the tube. The beta particles pass through the beryllium quite readily and produce heavy ionization in the gaseous atmosphere within the tube. The gamma rays penetrate the tube and produce electrons at the cathode by Compton scattering; the gamma rays ionize the gas only very slightly. The only effect of the production of the Compton electrons and faint ionization of the gas by the gamma rays is to create a low background count in the measuring circuit.

In tests made on an ice detector of the form described above, in which the source of beta rays was a 20 microgram sample of radium and the indicator was a 100 microampere meter, the following results, which demonstrate clearly the sensitivity of our device, were obtained:

| Ice Thickness, millimeters | Meter Indication, microamperes |
|---|---|
| 0 | 0 |
| 1 | 40 |
| 2 | 65 |
| 3 | 80 |
| 4 | 90 |
| 5 | 95 |

The ordinary ice detector presently available for use in aircraft begins to respond to ice accumulations of four to five millimeters.

It is well known that beryllium is an extremely difficult metal to work and particularly to solder to other metals. In United States Patent application Serial No. 544,968 filed July 14, 1944 by Herbert Friedman and Michael McKeown, now abandoned there is disclosed a relatively simple and extremely effective method of rendering beryllium easy to solder with commercial silver solder.

The advantages of our apparatus can be summarized as follows.

It detects the beginning of ice formation on the surface with which it functions;

It indicates quantitatively the amount of ice which has gathered;

It can be used to measure the rate of ice formation on the surface of the aircraft by timing the accretion of ice on the surface being observed.

Since certain changes may be made in the construction of the ice detector which we have disclosed and different embodiments of the invention could be made without departing from the scope thereof, it is intended that all matter contained in the above description or shown in the accompanying drawings shall be interpreted as illustrative and not in a limiting sense.

The invention decribed herein may be manufactured and used by or for the Government of the United States of America for governmental purposes without the payment of any royalties thereon or therefor.

Having described our invention, what we claim as new and desire to secure by Letters Patent is:

1. An ice warning device for aircraft comprising a source of beta radiation, a Geiger-Muller tube and a rate meter circuit, said Geiger-Muller tube having a radiation permeable window made substantially flush with a surface of the aircraft subject to ice formation thereon, said source of beta radiation positioned in spaced relation to said window so that ice on said window will absorb radiation from said source and decrease the frequency of pulsing of the Geiger-Muller tube, and said meter circuit responsive to said frequency of pulsing to indicate the thickness of ice formed on the window.

2. Ice detecting apparatus for use in aircraft to determine the rate of ice formation on a surface thereof comprising a source of beta radiation, a support to mount said source in spaced relation on one side of said surface, a Geiger-Muller counter as a detector for said radiation mounted on the other side of said surface in a position to receive radiation from said source, a heater element operable to free said support and said surface from ice formation, and a radiation intensity measuring circuit electrically connected to said Geiger-Muller counter.

3. An ice detection system for use in aircraft comprising a plurality of sources of beta radiation respectively mounted in spaced relation to surfaces of the aircraft subject to ice formation, a plurality of Geiger-Muller tubes as detectors for said radiation respectively mounted behind said surfaces to detect radiation passing therethrough, a radiation intensity measuring and indicating circuit, and selective switching means for selectively connecting any one of said detectors to said radiation intensity measuring and indicating circuit.

4. In combination, a surface of an airfoil, a source of penetrating radiation the penetrability of which is sensitive to ice formations mounted in spaced relation on one side of said surface, a detector for said radiation positioned on the other side of said surface and extending through said surface and terminating in the plane of said one side and means responsive to the output of said detector for indicating formation of ice on said one side of said surface.

5. In combination, a surface of an airfoil, a source of penetrating radiation the penetrability of which is sensitive to ice formations positioned in spaced relation on one side of said surface, and a detector for said radiation mounted on the other side of said surface, said detector comprising a Geiger-Muller tube having a radiation permeable window mounted substantially flush with said surface.

6. In combination, a source of radiation comprising alpha and beta rays, a detector for said radiation, a surface subject to formation of ice interposed between said source and said detector, a window of beryllium mounted flush with said surface in the path of said radiation to prevent passage of said alpha rays to said detector and means indicating radiation absorbed by said detector as a function of thickness of said ice.

7. In combination, a surface of an aircraft subject to formations of ice on one side thereof, a source of penetrating radiation the penetrability of which is sensitive to ice formations, mounting means spacing said source from said one side of said surface to direct radiation thereto without substantially interfering with the formation of ice on that portion of said surface to which the radiation is directed, a radiation detector positioned on the other side of said surface to intercept radiation from said source, a radiation intensity measuring circuit responsive to the output of said detector and indicating means responsive to the output of said circuit to indicate ice formations on said surface.

8. In combination, a surface subject to formations of ice on one side thereof, a source of penetrating radiation the penetrability of which is sensitive to ice formations spaced from said one side of said surface to direct radiations thereto, a radiation detector positioned on the other side of said surface to intercept radiation from said source, said radiation detector having a radiation permeable window made substantially flush with said one side of said surface, and means indicating the intensity of radiation absorbed by said detector as a function of ice formation thickness on said surface.

9. In combination, a surface of an aircraft subject to ice formations on one side thereof, a source of penetrating radiation the penetrability of which is subject to ice formations, means mounting said source in spaced relation to said one surface to direct radiation thereto, a detector positioned on the other side of said surface to intercept radiation from said source and a radiation intensity measuring circuit responsive to the output of said detector for indicating the thickness of ice formation on said surface as a function of radiation absorbed by said detector.

10. An ice detection system for use in aircraft comprising a plurality of sources of penetrating radiation the penetrability of which is sensitive to ice formations mounted in spaced relation to surfaces of the aircraft subject to ice formations to direct radiation thereto, a plurality of radiation detectors mounted behind said surfaces to detect radiation passing therethrough, and means for selectively indicating the output of said detectors as a function of ice formation on the surface associated therewith.

11. In combination, a surface subject to ice formation on one side thereof, a source of penetrating radiation the penetrability of which is sensitive to ice formations mounted in spaced relation on one side of said surface, a detector for said radiation positioned on the other side of said surface and extending through said surface and terminating in the plane of said one side thereof, and means responsive to the output of said detector for indicating formation of ice on said one side of said surface.

HERBERT FRIEDMAN.
LESTER WOLFE.

REFERENCES CITED

The following references are of record in the file of this patent:

UNITED STATES PATENTS

| Number | Name | Date |
|---|---|---|
| 2,264,725 | Shoupp | Dec. 2, 1941 |
| 2,315,819 | Schlesman | Apr. 6, 1943 |
| 2,349,429 | Herzog | May 23, 1944 |